United States Patent [19]
Meazza

[11] 3,731,586
[45] May 8, 1973

[54] CAMERA CASE WITH RETRACTABLE VIEWFINDER

[75] Inventor: Roberto Meazza, Milan, Italy

[73] Assignee: Minnesota Mining and Manufacturing Company, St. Paul, Minn.

[22] Filed: Oct. 18, 1971

[21] Appl. No.: 190,176

[30] Foreign Application Priority Data

Oct. 16, 1970   Italy..................54097 A/70

[52] U.S. Cl. ................88/1.5 R, 95/11 V, 150/52 J
[51] Int. Cl. .....................G03b 13/04, A45c 11/38
[58] Field of Search.........................88/1.5; 95/11 V, 95/42, DIG. 1; 150/52 J

[56] References Cited

UNITED STATES PATENTS

| | | | |
|---|---|---|---|
| 2,132,549 | 10/1938 | Wenstrom | 95/86 X |
| 2,930,301 | 3/1960 | Land et al. | 95/13 |
| 2,225,351 | 12/1940 | Resk | 95/42 |
| 1,680,647 | 8/1928 | Stark et al. | 88/1 UX |
| 2,634,661 | 4/1953 | Roth | 150/52 J X |
| 2,718,833 | 9/1955 | Roth | 150/52 J X |
| 3,153,995 | 10/1964 | Bretthauer et al. | 95/11 V |

*Primary Examiner*—Ronald L. Wibert
*Assistant Examiner*—F. L. Evans
*Attorney*—Kinney, Alexander, Sell, Steldt & Delahunt

[57] ABSTRACT

A camera case which includes a retractable view finder having substantially parallel plate members with opposed, view-finding orifices therein, the plate members being retractable through slots in the case to assume positions between adjacent walls of the camera and the case.

3 Claims, 3 Drawing Figures

PATENTED MAY 8 1973 3,731,586

INVENTOR.
ROBERTO MEAZZA
BY Kinney, Alexander,
Sell, Steldt & DeLaHunt
ATTORNEYS

CAMERA CASE WITH RETRACTABLE VIEWFINDER

The present invention relates to cameras, and more particularly to simplified camera cases having retractable view finders.

To avoid the high initial cost of cameras, particularly in amateur photography, it is desired that inexpensive, single use cameras be provided. It is an object of the present invention to provide a simple, inexpensive, but reliable camera case for inexpensive cameras. It is another object of the invention to provide an inexpensive camera case having a retractable view finder for such cameras.

Briefly, the present invention relates to a camera case for enclosing a camera having movable parts for operation thereof and having a lens. The walls of the case define generally a parallelepipedon and have access openings therein to permit access to movable parts of the camera. The case has front and rear walls adapted to cover front and rear walls of the camera, the front wall of the case having a lens opening therein adjacent the lens of the camera. The case includes a retractable view finder having open and closed positions, which view finder comprises substantially parallel plate members with opposed orifices therein. The plate members are joined by a connecting member, and the view finder is hingedly attached to a wall of the case which abuts the front wall thereof to permit the view finder to pivot about a line generally parallel to the focal axis of the camera lens. The camera case has opposed, substantially parallel slots therein positioned to receive the plate members of the view finder respectively between the front walls of the camera and the case and the rear walls of the camera and the case when the view finder is retracted from the open position to the closed position.

In its preferred embodiment, the connecting member of the retractable view finder described above is an integral extension of the wall of the camera case which abuts the front wall thereof, and it is also preferred that the plate members be integral extensions of the connecting member. In its most preferred embodiment, the camera case of the present invention, together with the retractable view finder thereof, is formed from a single sheet of camera case material (stiff, creasable material as is known in the art).

Figure 1:
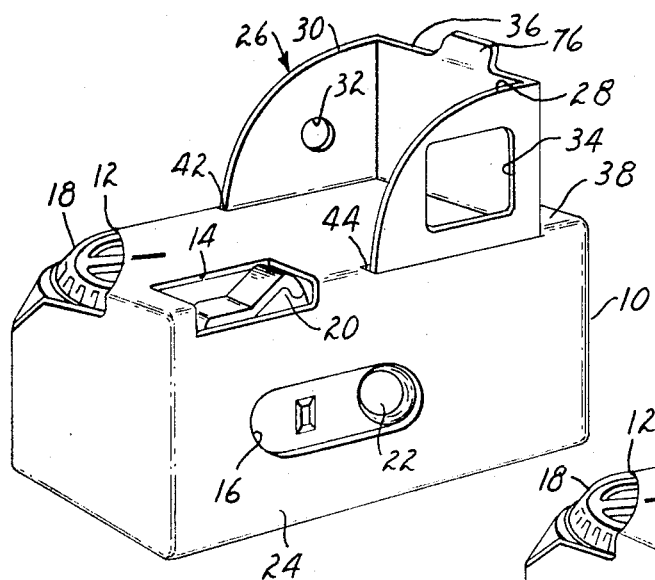
FIG. 1 is a perspective view of a camera provided with the camera case of the present invention, the retractable view finder being shown in the open position.

Referring to FIG. 1 of the drawing, the camera case of the invention comprises walls 10 defining generally a parallelepipedon, which walls have openings (12, 14, 16) to provide access to movable parts of the camera (film winder 18, shutter switch 20, and lens 22), said walls including a front wall 24 and a rear wall (not shown) which enclose front and rear walls of said camera (not shown). As noted, the front wall 24 of the case has a lens opening 16 therein adjacent the lens 22 of the camera.

The retractable view finder 26 includes substantially parallel plate members 28 and 30 having opposed orifices 32 and 34 therein, which orifices are aligned in a direction substantially parallel with the focal axis of the lens and which are employed for sighting upon an object to be photographed. Plate members 28 and 30 are joined by connecting member 36, which preferably is an integral extension of wall 38. Plate members 28 and 30 are preferably integral extensions of the connecting member 36. The view finder is hingedly attached to wall 38 of the case (which abuts front wall 24 thereof) so that the view finder is permitted to pivot about a line (shown in FIGS. 2 as 40) which is generally parallel to the focal axis of the lens 22.

Figure 2:
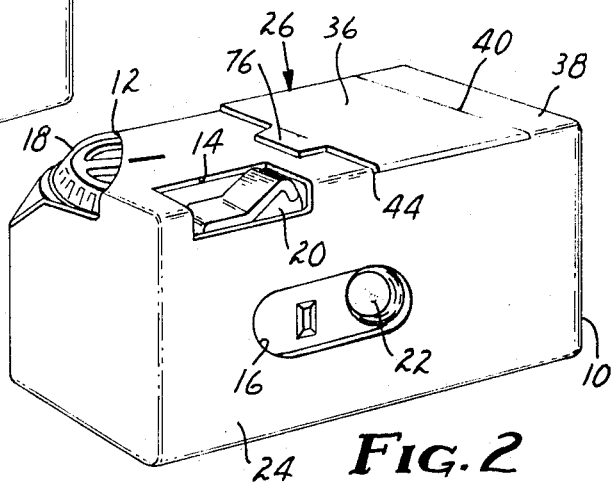
FIG. 2 is a perspective view of a camera provided with the camera case of the invention with the retractable view finder being shown in the retracted, or closed position.

The case is provided with opposed, substantially parallel slots 42 and 44 which are positioned substantially along the line of abuttment of said wall 38 with the front and rear walls of the case, the slots being positioned to receive plate members 28 and 30 respectively between the front walls of the camera and case and the rear walls of the camera and case when the view finder is retracted from the open position (shown in FIG. 1) to the closed position (shown in FIG. 2). The plate members 28 and 30 may be provided with projections (shown as 50 and 52 in FIG. 3) which are positioned to remain within slots 44 and 42 and to contact the inner surface of wall 38 when the view finder has been moved to the open position, thereby preventing said plate members from escaping completely from said slots.

Figure 3:
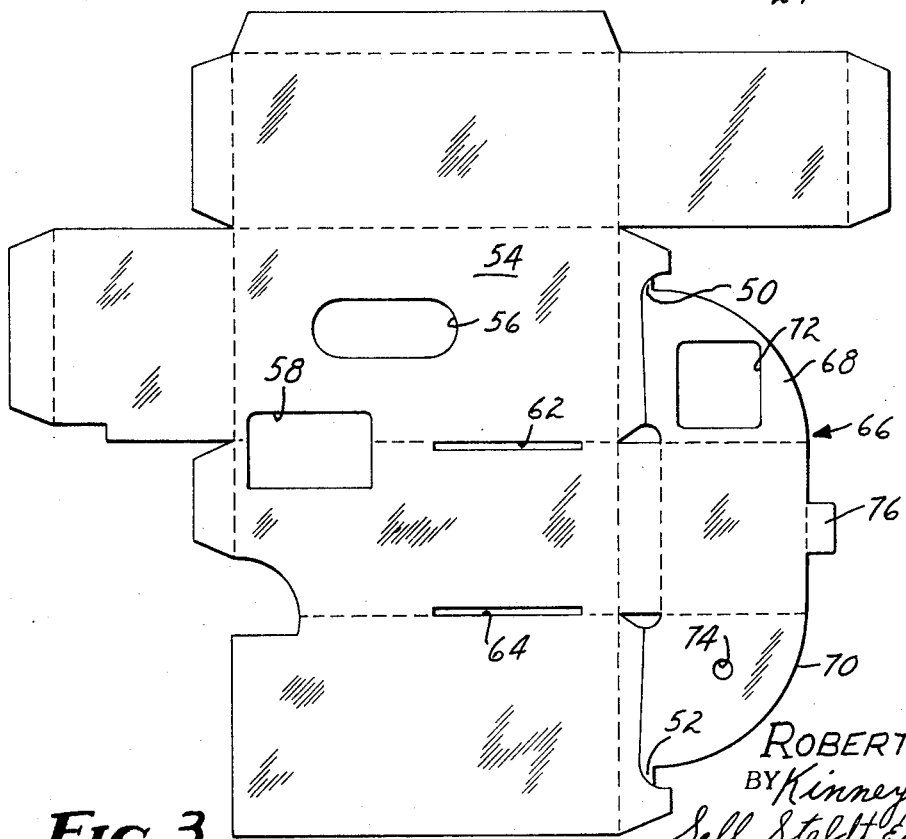
FIG. 3 is a cut-out pattern of camera case material suitable for preparing the camera case shown in FIGS. 1 and 2.

As noted above, in its most preferred embodiment, the camera case of the present invention is prepared from a single, continuous sheet of camera case material. A suitable "cut-out" pattern for this purpose is depicted in FIG. 3 wherein the dashed lines represent lines upon which the cut-out is to be folded or creased to provide the shape depicted in FIGS. 1 and 2. The cut-out pattern, when folded into the shape depicted in FIGS. 1 and 2, may then be connected in place by glue, stitchings, stapling, etc. In FIG. 3, the front wall of the camera case is designated 54 and is provided with lens opening 56 therein. Opening 58 corresponds to opening 14 of FIGS. 1 and 2, and slots 42 and 44 respectively are depicted as 64 and 62. The retractable view finder is designated generally as 66 in FIG. 3, and is provided with parallel plate members 68 and 70 and orifices 72 and 74. Tab 76 (shown on all figures) is provided as an extension of the connecting member to permit the retractable view finder to be grasped and opened.

I claim:

1. A camera case for enclosing a camera having movable parts for operation thereof and having a lens, the walls of said case defining generally a parallelepipedon and having access openings therein to permit access to movable parts of said camera, said case having front and rear walls for covering front and rear walls of said camera, the front wall of said case having a lens opening therein adjacent the lens of said camera, said case including a retractable view finder having open and closed positions and comprising substantially parallel plate members with opposed orifices therein and joined by a connecting member, said view finder being hingedly attached to a wall of said case which abuts said front wall to permit said view finder to pivot about a line generally parallel to the focal axis of said lens, said case having opposed, substantially parallel slots therein positioned to receive said plate members respectively between said front walls of said camera and case and said rear walls of said camera and case when said view finder is retracted from said open to said closed position.

2. The camera case of claim 1 wherein said connecting member is an integral extension of said case wall which abuts said front wall thereof.

3. The camera case of claim 2 wherein said plate members are integral extensions of said connecting member.

* * * * *